March 12, 1940. S. HURWIT Re. 21,392

WOVEN SHOE

Original Filed Dec. 30, 1938 2 Sheets-Sheet 1

Inventor

Sol Hurwit

By Lyon & Lyon

Attorneys

March 12, 1940. S. HURWIT Re. 21,392

WOVEN SHOE

Original Filed Dec. 30, 1938 2 Sheets-Sheet 2

Inventor

Sol Hurwit

By Lyon & Lyon

Attorneys

Reissued Mar. 12, 1940

Re. 21,392

UNITED STATES PATENT OFFICE 21,392

WOVEN SHOE

Sol Hurwit, Los Angeles, Calif.

Original No. 2,161,472, dated June 6, 1939, Serial No. 248,591, December 30, 1938. Application for reissue October 9, 1939, Serial No. 298,710

5 Claims. (Cl. 36—3)

This invention relates to a woven shoe and is a continuation in part of my prior application Serial Number 193,934 filed March 4, 1938. Sandals of this general type have been constructed, in which interlaced or interwoven strips have been employed, said strips being laced through perforations in the insole of the sandal. Sandals of this type with loosely laced strips have become quite popular in warm climates, but heretofore they have not been constructed in such a way as to form a substantial shoe adapted to be worn about town like an ordinary shoe.

A principal object of this invention is to produce a shoe of this general type, in which a substantial connection is established between the upper and the insole, and presenting lacing of a character to form a weave of closely associated strands connecting the upper and sole.

A further object of the invention is to provide a construction of this type, in which the upper is rigidly secured to the shoe heel.

A further object of the invention is to provide a shoe, which will have the ornamental appearance of a shoe formed with laced strips, but in which the foot within the shoe will be protected from pressure by the strips that would otherwise be in contact with it.

Further objects of the invention will appear hereinafter.

The invention consists in the novel parts and combination of parts to be described hereinafter, all of which contribute to produce an efficient woven shoe.

A preferred embodiment of the invention is described in the following specification, while the broad scope of the invention is pointed out in the appended claims.

Before proceeding to a more detailed description of the invention, it should be stated that in practicing the invention I provide an upper, which is a continuous piece and preferably a single piece of leather forming the toe portion or box of the shoe, the vamp portion, and the heel portion or quarters. I provide this upper with rows of slits placed in such a way that courses of strips of leather can be passed through these slits. These courses include, on each side of the shoe an instep course that passes through perforations in the insole, and these strips cover the instep portions of the shoe. Forward of this course of strips a toe course of strips is provided that passes completely across the upper side of the shoe, being laced through perforations of the insole. In addition to this I provide another course of strips that pass through the slits in the quarters or heel portion of the shoe, and these are interwoven with the instep courses, and also pass through the perforations in the margin of the insole.

The shoe preferably includes a counter liner that covers the strips at the heel portion on the inside of the upper, to prevent discomfort to the wearer of the shoe.

Figure 1:
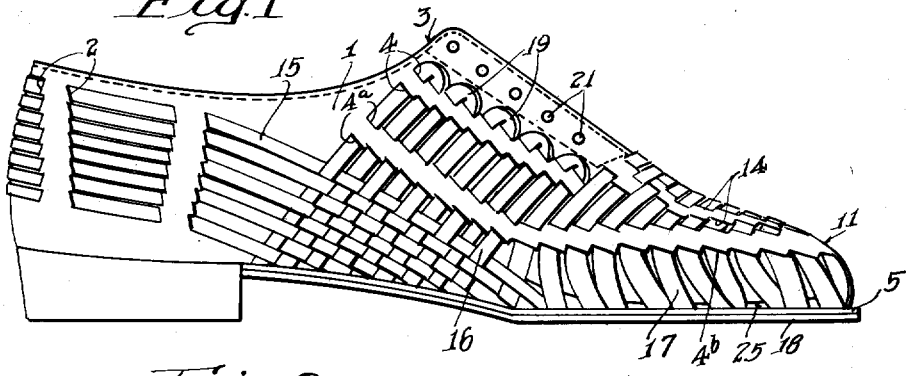
Fig. 1 is a side elevation of a low shoe embodying my invention.

Referring to the drawings, 1 indicates the upper of the shoe which is provided at the heel portion and quarters with rows of slits 2, and at the vamp portion 3 with rows of slits indicated generally by the numeral 4. The number of rows of slits may be increased or decreased, or arranged so as to present various design effects. In the present instance, the former slits 2 are made in a substantially vertical plane, and each slit may be slightly inclined more or less in a direction so that the slits given an echelon effect, or any desired design effect. The rows of slits 2 extend in a more or less vertical direction, while the slits 4, preferably in four sets, are disposed on an inclined line, and these slits are also disposed so as to give an echelon effect. This enables the slits to slightly overlap, which will bring the edges of the strips closer together, as will appear from Figure 1.

It will be evident that the arrangement of the slits may carry out any desired design effect.

Figure 3:
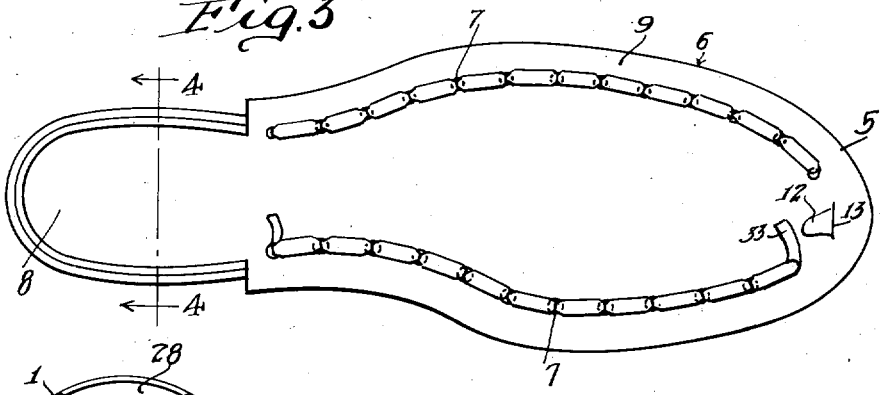
Fig. 3 is a bottom plan of the insole, and showing a portion of the upper at the heel seat of the insole.
Figure 4:
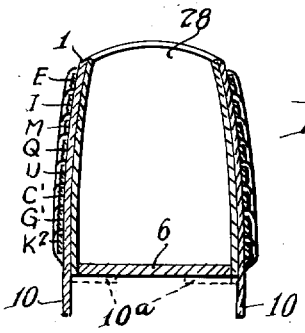
Fig. 4 is a vertical section taken on the line 4—4 of Fig. 3, and illustrating a stage in the formation of the shoe at the heel.

The shoe includes an insole 5 (see Fig. 3) which has the contour of the shoe, and which is provided near its edge 6 on each side with a row of openings 7; each opening at each side preferably has a corresponding opening directly opposite to it on the other side, except that the side upon which the lacing begins and ends has one less hole than the opposite side. The insole is preferably formed at its heel portion with a heel seat tongue 8 that is of considerably less width than the shank portion 9 of the insole, but shaped to fit the contour of the heel portion of the shoe. The upper 1 at its heel portion is formed with a downward extension 10, and in making the shoe, this part is folded inwardly as indicated by the dotted lines $10^a$, and lasted against the under side of the insole tongue 8.

The slits 4 include two lower rows $4^a$, and these two rows $4^a$ do not terminate at the vamp as the upper ones do, but are continued in a more or less horizontal direction to form rows of slits $4^b$ that extend forwardly to the toe portion or box 11 of the shoe. The extreme forward end of the toe portion and the upper, is formed with a tongue 12 that is pushed down through a slit 13 in the insole. In addition to the rows of slits $4^b$, other additional rows of slits 14 may be provided across the toe portion at the upper side of the shoe.

The upper portion of the shoe is completed by means of strips of material, preferably leather, which strips are woven through the slits preferably in three courses 15, 16 and 17. The strip of stock is preferably in long lengths, so that few knotted connections between the strips are necessary. Whenever such connections are necessary to continue the lacing operation, they are preferably formed in a flat knot lying under the insole and between the insole and the outer sole 18.

Figure 5:
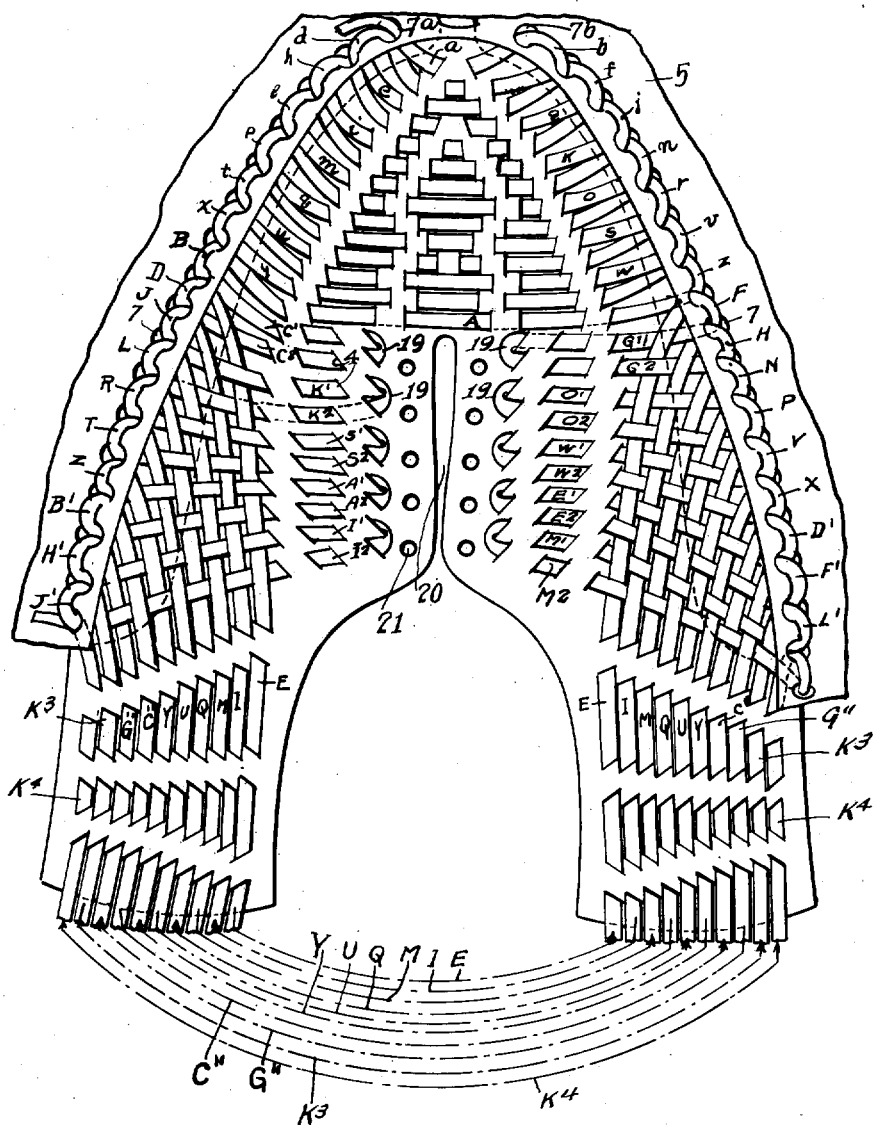
Fig. 5 is a diagrammatic developed plan of the shoe upper, and indicating the edge of the sole as though cut, turned outwardly, and broken away. This view indicates the entire course of the lacing operation.

One of the characteristics of this shoe is that the strips lace to and fro across the toe portion, and lie alongside of each other with their edges adjacent. Figure 5 illustrates diagrammatically the complete lacing of the shoe. This view is a developed plan illustrating the laced portion of the shoe as though the upper were cut in half on the central plane at the heel, so that the material of the shoe can be laid flat on a horizontal surface, and at the same time the edge of the sole is represented as though it is folded up in an inverted position so that the bottom of the sole is presented uppermost. This enables the complete lacing to be illustrated.

In performing the lacing operation, the operator preferably starts from the underface of the insole at that one of the two foremost openings, or perforation $7^a$, that is on the side having the lesser number of openings (see Figure 5), and he passes a lacing through said perforation to the upper face of the insole and through the forwardmost slits in the upper 1. This forms a strip *a*, and at the other side of the shoe the lacing is passed down through the second of the two foremost perforations, indicated by the numeral $7^b$, and is then passed along the underside of the insole 5, forming a flat extension *b* on the bottom of the insole. The lacing is then laced upwardly through the perforation rearwardly of and next to the perforation $7^b$ and through the slits in the upper next adjacent to the forwardmost slits in the toe to the opposite side, passing down through the starting perforation $7^a$, and thence rearwardly along the bottom of the insole to form a flat extension *d* on the bottom of the insole. From this point the lacing proceeds in the same manner; that is, up through the insole, across the upper and through the slits thereof to the opposite side and down through the rearmost occupied perforation in said side, then rearwardly along the underside and upwardly through the next adjacent perforation, resulting in forming a plurality of cross strips, *e, g, i, k, m, o, q, s, u, w,* and *y,* which are formed by passing the strip back and forth and lacing the same through the perforations 7 as indicated. In this way the lacing in the toe portion of the shoe is substantially completed by the passing of the final cross strip A. In lacing in this way, it will be seen that on one side of the shoe extensions of the strip are formed under the insole, as indicated by the letters *h, l, p, t,* and *x,* and on the opposite side by the extensions under the insole, indicated by the letters *f, j, n, r, v,* and *z.* These letters are applied to the portion of the lacing in the order in which they are formed by passing the lacing to and fro through the slits. In lacing the strip A, the lacing is passed from the right side to the left, as seen in Fig. 5, passing down through the insole perforation last traversed on the left side by the strip, and is extended rearwardly to form the underlying extension B of the lacing at the left side. From this point the lacing passes upwardly to form an ascending strip C′ that forms a loop 19 on the outer side of the upper, adjacent the gap or throat 20 of the upper, and adjacent to the eyelets 21. From this point loop 19 of the lacing extends downwardly in a descending strip $C^2$ and thence through the perforation 7 in the insole rearwardly next adjacent the last perforation traversed by the strip in that side of the insole, and thence forwardly, that is, toward the toe end of the insole, to form the underlying extension D on the bottom of the insole. From this point the lacing passes upwardly through the next adjacent perforation, and thence passes toward the heel end of the shoe to form the uppermost strip E that passes around to the opposite side of the shoe. In so doing the strip E is laced through the slits 2 in the heel portion and quarters of the shoe, and passes forwardly on the right hand side of the shoe where it passes downwardly through the same perforation that holds the transverse strip A. From this point the lacing extends rearwardly, forming an underlying extension F, and thence passes upwardly through the rearwardly next adjacent perforation, and thence passes upwardly through the slits 4 of the vamp to form an ascending strip G′ terminating in a loop 19, from which point the lacing passes downwardly to form a descending strip $G^2$. This strip $G^2$ passes down through that perforation 7 that is rearwardly next adjacent the perforation last traversed by the lace, and thence passes forwardly to form the underlying extension H under the insole. From this point the lacing passes upwardly through the adjacent perforation and thence rearwardly on this side of the shoe to form the horizontal strip I that passes around to the other side of the shoe, being passed through the slits 2 on the heel portion and quarters of the shoe, and extending forwardly to the perforation that carries the rear end of the horizontal extension D; at this point the lacing passes downwardly through said perforation to form a horizontal rearwardly extending underlying extension J, and thence the lacing passes upwardly to form an ascending strip K′ that passes upwardly and is interwoven with the rearwardly extending strips E and I and forms a loop 19. From this loop the lacing passes downwardly, forming an adjacent strip $K^2$, which strip at its lower end passes down through that perforation 7 that is rearwardly next adjacent the perforation last traversed by the lace, and thence forwardly to form a horizontal underlying extension L under the insole. From this point the lacing passes upwardly through the adjacent perforation and thence around to the other side of the shoe, forming the third horizontal lacing strip M. As this lacing operation proceeds, the strips that pass around the heel are, of course, interwoven with the more or less upright strips that pass up to the loops 19. The strip M at the right hand side of the shoe, passes down through the perforation last traversed, on that side, by the lace, and thence rearwardly to form a horizontal underlying extension N on the underside of the insole, thence passing upwardly to form a corresponding loop 19 at the right side of the shoe. In this way, that is, when the strip comes down to the insole from a loop 19 on either side of the upper, it passes through the perforation rearwardly next adjacent the perforation last traversed, on that side, by the strip, and then forwardly to said perforation, up through said perforation, and round the rear of the upper to the other side thereof, but when the strip comes down to the insole from the rear of the upper, it passes through the perforation last traversed, on that side, by the strip, and then rearwardly to the rearwardly next adjacent perforation and up through said perforation, thence upwardly to form a loop 19. After the last loop 19 on the side opposite the starting perforation has been formed and the strap has been passed around the rear of the shoe to the other side thereof and the end thereof has been passed through the perforation last traversed on said side, any excess is tucked under the rearmost extension J′, or it may be otherwise secured to the insole. It will be observed that the rearmost perforation on the side opposite the starting perforation 7[a] could be omitted and the section $M^2$ could be passed through the resulting rearmost perforation. Thus the lacing proceeds so as to form a plurality of more or less upright vamp strips O′, $O^2$, W′, $W^2$, E′, $E^2$, M′, and $M^2$, and connected with underlying horizontal extensions of the lacing P, V, X, D′, F′ and L′. On the other side of the shoe substantially upright vamp strips S′, $S^2$, A′, $A^2$, I′ and $I^2$, will be formed, which connect at their lower ends with horizontal underlying extensions R, T, Z, B′, H′, and J′. In the completed shoe the heel portion and quarters will carry strips E, I, M, Q, U, Y, C″, G″, $K^3$, and $K^4$.

The loops 19, of course, are formed quite near the eyelets 21 carried by the upper for receiving the regular lacing, or tie, of the Oxford shoe.

Figure 2:
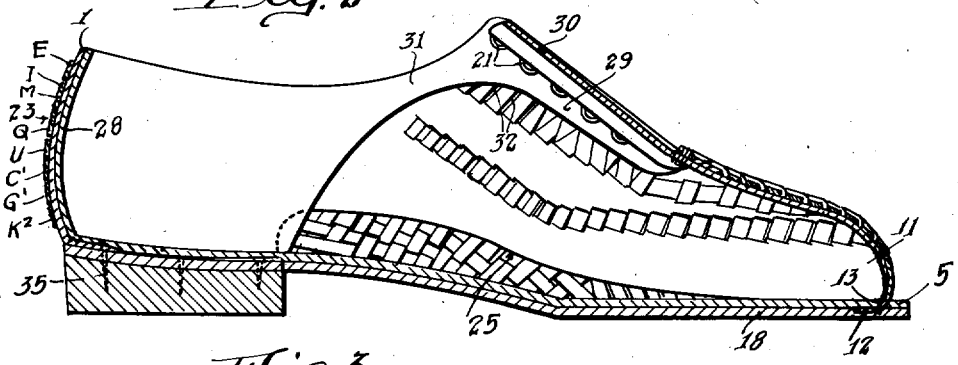
Fig. 2 is a longitudinal vertical section through the shoe illustrated in Fig. 1.

From the heel 23 to the toe, the upper is preferably unattached to the insole; that is to say, the lower side edges 25 of the upper are free and preferably located at a considerable distance from the insole near the shank of the shoe (see Figure 2). Toward the toe the edges 25 approach closely to the insole, but are unattached to it. At the toe the upper is attached to the insole by means of the centrally disposed tongue 12 that extends down through the slit 13 in the insole. At the rear portion of the shoe, a counter 28 is provided that is preferably of skeleton form toward the front, having two extensions 29 lying under the flaps 30 of the upper near the eyelets 21, and connected by a narrow neck 31 to the body of the counter. This skeleton form counter gives reinforcement to the flaps 30 where the eyelets 21 are located, and also keeps the strips at the heel from coming in contact with the wearer's heel, which would be uncomfortable. The extensions or forward tongues 29 of the counter 28 are preferably quite narrow, so as to leave a portion of the instep strips uncovered on their inner sides, thereby leaving ventilating spaces 32 between the same as indicated in Figure 2. This greatly assists in the ventilation of the shoe and renders it very cool and comfortable when worn in hot weather.

This ventilating effect is enhanced by having the lower edges 25 of the upper located considerably above the insole, as is also indicated in Figure 2.

The front end 33 of the lacing (see Figure 3) is secured to the underside of the insole.

The shoe is completed by an out-sole 18 under the insole, that may be sewed or otherwise secured to the insole around the edges of the same. At the heel the insole and the out-sole may be secured together to the heel 23 by glue, or nails 35.

Many other embodiments of this invention may be resorted to without departing from the spirit of the invention.

What I claim is:

1. An Oxford shoe having an insole with a row of perforations adjacent to and substantially parallel with each of its opposite edges, an upper consisting of a toe portion, instep portions, and quarters formed integrally with each other, said upper having a plurality of rows of slits on the toe portion, on the instep portions, and on the said quarters, said instep portions each having a row of eyelets at the upper edge thereof, a toe-course of transverse strips formed of a lacing laced through the forward perforations of the insole and through the slits of the said toe portion so that the said strips are composed of pairs of transverse strips attached through a corresponding single perforation at one side, an instep course of strips at each side of the upper, each instep course being laced through the perforations of the insole and passing through the slits of the instep portion and up to a point adjacent the eyelets, and a quarter course of strips laced through the slits of the quarters and interwoven with the strips of the instep course.

2. An Oxford shoe having an insole with a row of perforations adjacent to and substantially parallel with each of its opposite edges, an upper consisting of a toe portion, instep portions, and quarters, formed integrally with each other, said upper being rigidly secured to the insole adjacent the heel of the shoe, said upper having a plurality of rows of slits on the toe portion, on the instep portions, and on the said quarters, each of said instep portions having a row of eyelets at the upper edge thereof, a toe-course of transverse strips formed of a lacing laced through the forward perforations of the insole and through the slits of the said toe portion so that the said strips are composed of pairs of transverse strips attached through a corresponding single perforation at one side, an instep course of strips at each side of the upper, each instep course being laced through the perforations of the insole and passing through the slits of the instep portion and up to a point adjacent the eyelets, and a quarter course of strips laced through the slits of the quarters and interwoven with the strips of the instep course.

3. An Oxford shoe having an insole with a row of perforations adjacent to and substantially parallel with each of its opposite edges, an upper consisting of a toe portion, instep portions, and quarters, formed integrally with each other, said upper being rigidly secured to the insole adjacent the heel of the shoe, said upper having a plurality of rows of slits on the toe portion, on the instep portions, and on the said quarters, each of said instep portions having a row of eyelets at the upper edge thereof, a toe-course of transverse strips formed of a lacing laced through the forward perforations of the insole and through the slits of the said toe portion so that the said strips are composed of pairs of transverse strips attached through a corresponding single perforation at one side, an instep course of strips at each side of the upper, each such course being laced through the perforations of the insole and passing through the slits of the instep portion and up to a point adjacent the eyelets, and a quarter course of strips laced through the slits of the quarters and interwoven with the strips of the instep courses, said upper having means for attaching the tip of the toe portion of the said insole, the edge of said upper from said tip to said heel portion being free from the insole and unattached to the same except through the medium of said strips.

4. An Oxford shoe having a sole; an insole with a row of perforations adjacent to, and substantially parallel with, each of its opposite edges; an upper consisting of a toe portion, instep portions and quarters integrally connected together, said upper having a plurality of rows of slits in the toe portion and in the instep portions; lacings flexibly connecting the sides of said upper to the side edges of the insole, said lacings including a toe-course of transverse strips formed of a lacing laced through the forward perforations of the insole and through the slits of the said toe portion; an instep-course of strips at each side of the upper, laced through the perforations of the insole upwardly and downwardly at each side of the upper through the said instep slits so as to form loops at the sides of the instep; the rear end of the upper being attached to the sole; and means connecting the toe portion of said upper to the sole forwardly of the lacings of said toe-course.

5. An Oxford shoe having an insole with a row of perforations adjacent to, and subjstantially parallel with, each of its opposite edges, an upper consisting of a toe-portion, instep-portions and quarters integrally connected together, said upper having a plurality of rows of slits in the toe-portion and in the instep portions, and having a centrally disposed throat with rows of tie-fastening members adjacent the edges thereof, lacings flexibly connecting the sides of said upper to the side edges of the insole, said lacings including a toe-course of transverse strips formed of a lacing laced through the forward perforations of the insole and through the slits of the said toe-portion, an instep-course of strips at each side of the upper, said strips being laced through the perforations of the insole upwardly and downwardly at each side of the upper through the said instep slits so as to form loops at the sides of the instep, a heel connected to the insole at the rear thereof, and means for connecting the toe-portion of said upper to the sole forwardly of the lacings of said toe-course.

SOL HURWIT.